United States Patent [19]
Bode

[11] 3,800,088

[45] Mar. 26, 1974

[54] APPARATUS FOR PRODUCING SPECIAL AUDIO EFFECTS UTILIZING PHASE SHIFT TECHNIQUES

[76] Inventor: Harald E. W. Bode, 1344 Abington Pl., Tonawanda, N.Y. 14120

[22] Filed: Aug. 28, 1972

[21] Appl. No.: 284,421

[52] U.S. Cl. .................... 179/1 J
[51] Int. Cl. .................... H03h 7/00
[58] Field of Search............ 179/1 J, 1 SA; 84/1.24, 84/1.25, 1.26

[56] References Cited

UNITED STATES PATENTS

| | | | |
|---|---|---|---|
| 3,586,783 | 6/1971 | Brickner | 179/1 J |
| 3,719,782 | 3/1973 | Barnum | 84/1.24 |

*Primary Examiner*—Kathleen H. Claffy
*Assistant Examiner*—Jon Bradford Leaheey

[57] ABSTRACT

This disclosure deals with significant innovations on an electronic apparatus for producing special effects by shifting the frequencies of audio signals through the use of the phase shifter technique for single sideband production. These innovations or the combination thereof consist of (1) the use of a beat frequency oscillator with two outputs in 90° phase relationship to facilitate frequency shifts of any amount and sign, exceeding the limitations of previously known phase shifter type audio frequency shifters by being capable of producing detuning effects down to and through zero frequency shift with a transition into sideband reversal, (2) the inclusion of an improved cascaded wideband audio frequency phase shifting circuit, (3) the addition of an inverse phase output circuit for the simultaneous production of an additive and a subtractive frequency shift, and (4) the exploitation of known means for making the beat frequency local oscillator voltage controllable.

5 Claims, 3 Drawing Figures

APPARATUS FOR PRODUCING SPECIAL AUDIO EFFECTS UTILIZING PHASE SHIFT TECHNIQUES

Figure 1:
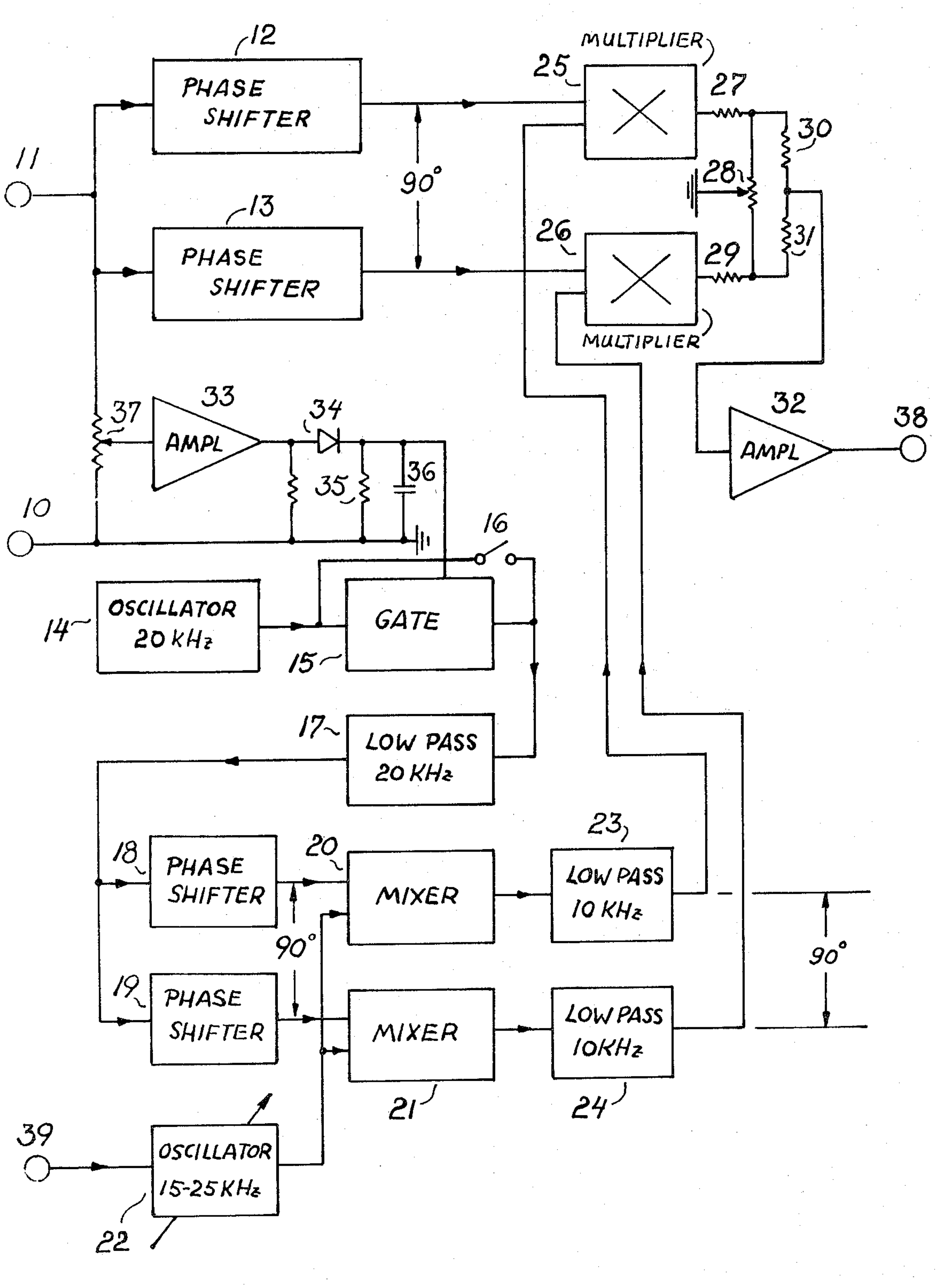

This invention relates to an electronic apparatus for producing special effects upon audio signals and more particularly it is concerned with the means for shifting the frequencies of audio signals by utilizing the phase shifter approach for single sideband production.

It is an object of the present invention to provide a circuit, which is capable of continuous frequency shifting from additive to subtractive frequency changes or vise versa. It is a further object of the invention to provide means for simultaneous additive and subtractive frequency shifting.

Another object of the invention is to provide means for changing the amount of frequency shift by modulation or voltage control or both.

Still another object of the invention is to provide a circuit, which is capable of shifting the frequencies of the entire audio range with the same quality of performance.

A further object of the invention is to provide means for frequency shifting, which essentially eliminate the generation of unrelated signals.

A further object is to provide a highly compact apparatus and circuitry of the above mentioned character.

In order to provide a frequency shifter of the above mentioned type, one of the most important considerations is the provision of means for phase shifting the audio signals as well as the frequency shifting signal so as to obtain signal pairs with the closest possible approximation of a 90° phase difference relative to each other.

A further important consideration is the provision of a frequency shifter with the most flexible performance, so as to exceed the performance range as well as the features of the presently known designs.

In known frequency shifters of the phase shifting type both the program signal and the frequency shifting signal are processed through phase shifting circuits, which yield output signal pairs essentially 90° out of phase within the audio frequency range, for instance in a range from 40 Hz to 10,000 Hz.

Since frequency shifts of less than 40 Hz and down to and through zero are quite desirable, the known frequency shifter design poses severe performance limitations.

According to this invention, therefore, the frequency shifting signals are generated by a beat frequency oscillator with one fixed and one variable ultrasonic frequency, said beat frequency oscillator being capable of delivering two output frequencies with a precise phase difference of 90° over the entire range to and through zero beats by provision of phase shifting means in the fixed frequency channel to produce a pair of output signals with a 90° phase difference relative to each other, and by providing a pair of mixers, receiving one of the phase shifted, fixed frequency signals each at one of their inputs and the variable frequency signal at their other input so as to produce beat frequencies with a phase difference of 90° relative to each other. In a known manner the mixers of this dual beat frequency oscillator are followed by low pass filters for the suppression of any unwanted higher frequencies.

Figure 2:
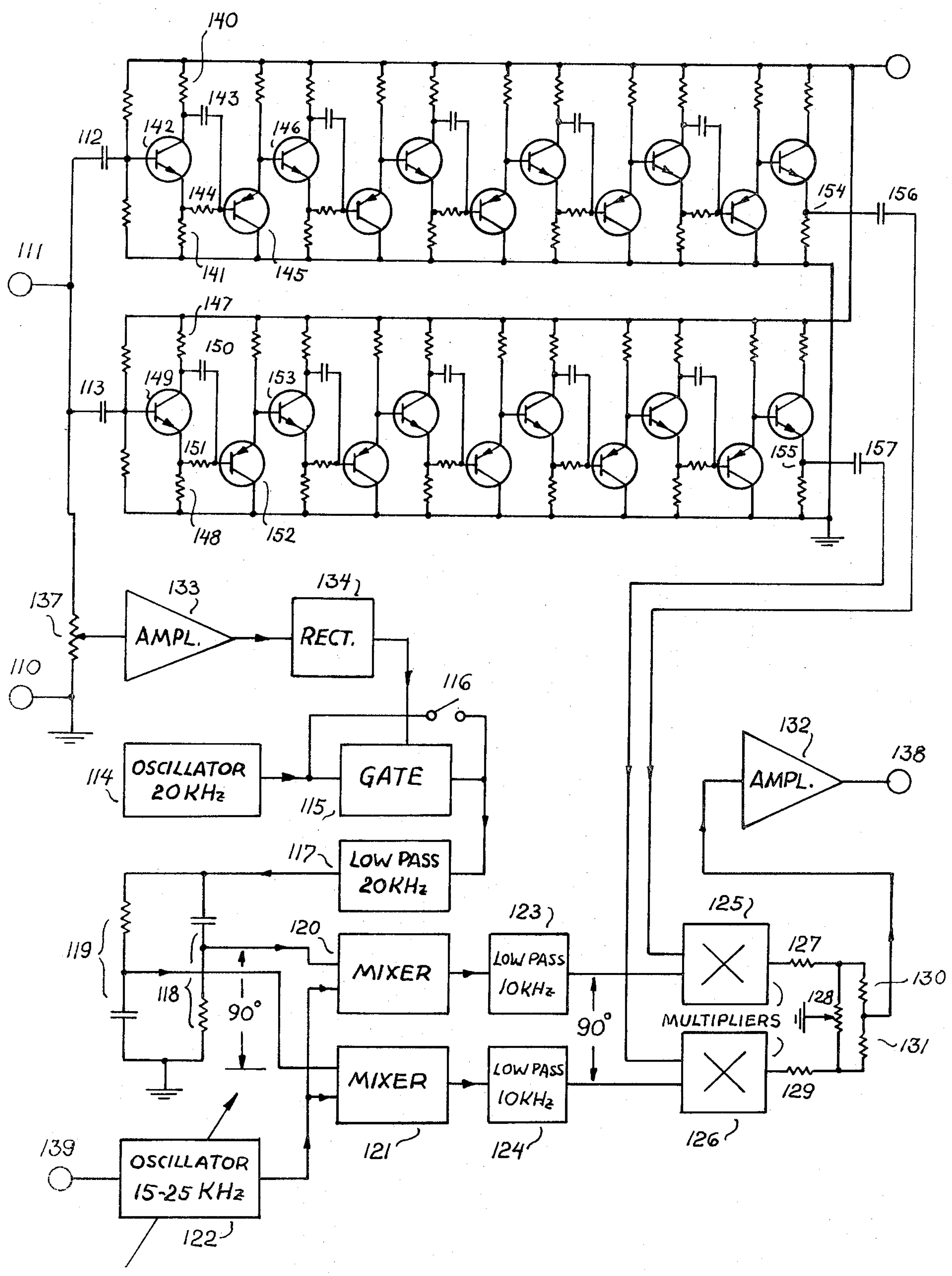
Figure 3:
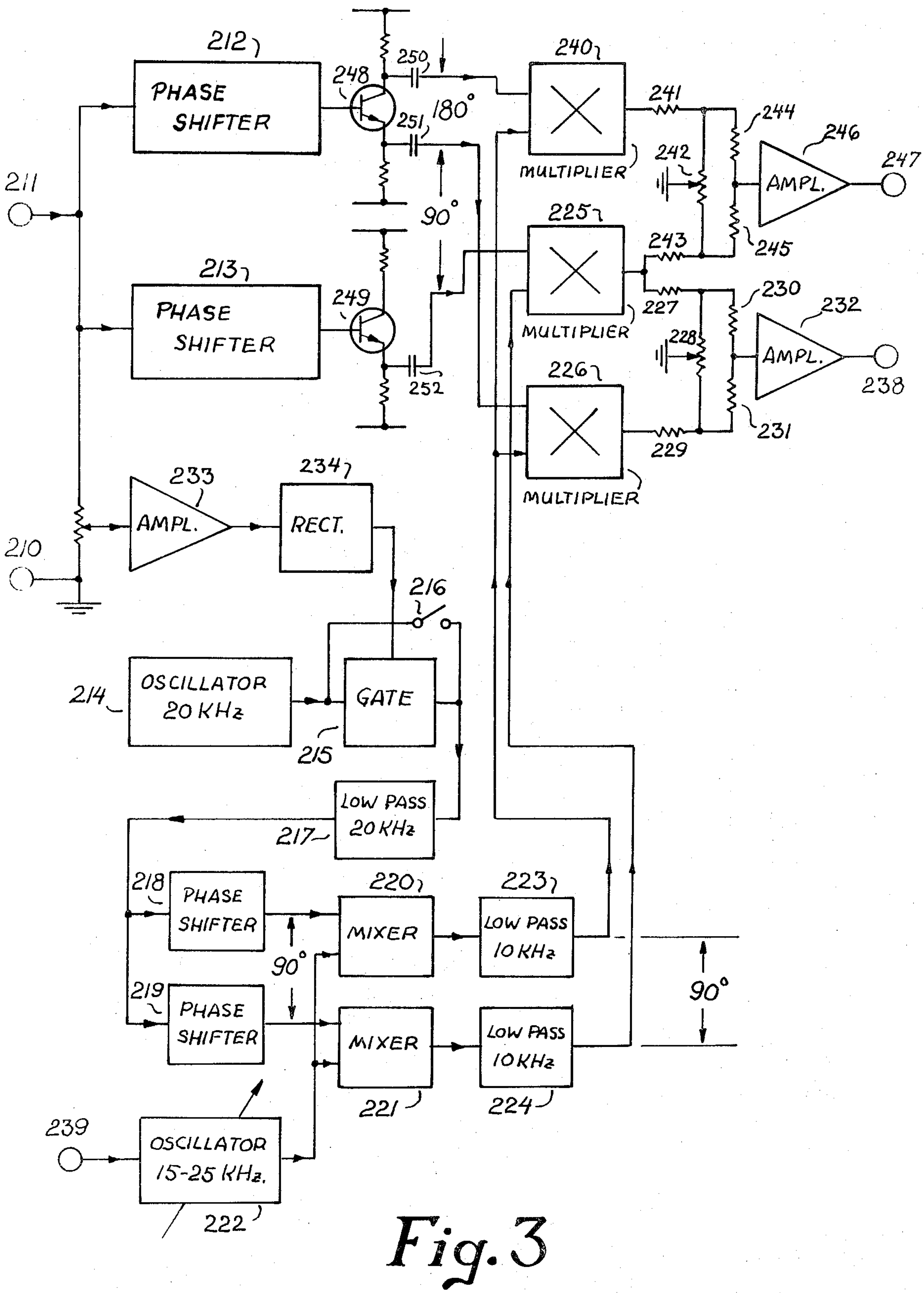

The novel feature of the invention, together with further objects and advantages thereof, will become more readily apparent when considered in connection with the accompanying drawings, in which:

FIG. 1 is a block schematic diagram of the apparatus according to the invention for the production of a single sideband, FIG. 2 is a schematic diagram of the same apparatus depicting some pertinent circuit details, and FIG. 3 is a block schematic diagram of the apparatus according to the invention for the simultaneous production of an additive and a subtractive frequency shift.

Referring now to the drawings and more particularly to FIG. 1, it will be observed, that the numerals 12 and 13 represent two phase shifting circuits, which receive audio signal from input 11, and which produce output signals with essentially 90° phase difference relative to each other. A fixed frequency oscillator 14 of a frequency well above the highest audio signal frequency, for instance 20 kHz, feeds through the optional gate 15 and the low pass filter 17 to the two phase shifters 18 and 19 for obtaining two oscillator signals with 90° phase difference.

The phase shifted fixed frequencies are then fed to one of the inputs of the multiplicative mixers 20 and 21, and a variable frequency signal from the oscillator 22, the center frequency of which equals that of the fixed frequency oscillator, is fed to the other inputs of the multiplicative mixers 20 and 21.

The beat frequencies produced in the mixers 20 and 21 display the same phase difference of 90° relative to each other as the signals processed through the phase shifters 18 and 19. The low pass filters 23 and 24 are provided to suppress any unwanted higher frequencies leaving the mixers 20 and 21. The signal pairs obtained at the outputs of the low pass filters 23 and 24 are further processed in the four quadrant multipliers 25 and 26. The multiplier 25 receives one audio signal from the phase shifter 12 and an oscillator signal from the low pass filter 23. The multiplier 26 receives one audio signal from the phase shifter 13 and an oscillator signal from the low pass filter 24.

The outputs of the multipliers 25 and 26 feed into a summing network with the potentiometer 28 for combining and balancing the output signals of said two multipliers, thus generating a resultant signal, which represents the input audio signal shifted by the amount of the beat frequency. This resultant signal is then fed to the output 38 through the amplifier 32. The sign of the frequency shift generated in the multipliers and the summing network depends upon the signs of the 90° phase relationships of the audio signals leaving the phase shifts 12 and 13 and the signs of the 90° phase relationships of the beat frequency signal pair leaving the low pass filters 23 and 24. When the variable frequency oscillator 22 is tuned through zero beat against the fixed frequency oscillator 14, the sign of the 90° phase relationship of the beat frequency signal reverses, which results in the change of an up-detuned signal at the output to a down-detuned signal and vise versa. An optional feature of the circuitry according to FIG. 1 is the inclusion of a threshold controlled gating circuit, which receives the audio signal through a potentiometer 37, an amplifier 33, a rectifier 34 with a charging capacitor 36 and a discharging resistor 35, which provide the bias and time constant for opening and closing a gate, such as implemented by a diode switching circuit, a field effect transistor switch, a bias controlled amplifier or a multiplier, to pass the signal from the oscillator 14 to the low pass filter 17, when an audio input signal is present, and when its amplitude has reached or exceeded a preset threshold level, which is determined by the setting of the potentiometer 37. A gate bypass switch 16 is provided for disabling the muting circuit, if it is not required or desired.

A further optional feature of the apparatus according to FIG.1 within the state of the art is the provision of means to make the variable frequency oscillator 22 voltage controllable and to provide a control input 39.

In FIG. 2 the design of the input circuits preceding the multipliers 125 and 126 is shown in detail. From FIG. 2 it will be observed, that the numerals 111 and 110 refer to the input signal and input signal return terminals respectively, and that the audio signal is fed through a capacitor 112 to a phase splitting circuit comprising the transistor 142 with the collector resistor 140 and the emitter resistor 141, both of which are essentially of equal resistive value in order to generate two signals of equal amplitude and opposite phase. A phase shifting network comprising a capacitor 143 and a resistor 144 is serially connected between the collector and the emitter of transistor 142 to produce an output signal at the base of transistor 145, which differs in phase from the input signal by approximately 139.5° at 40 Hz. This phase shifter stage is followed by an emitter follower stage comprising transistor 145 and a second phase splitter stage comprising transistor 146 with an associated phase shifting network similar to that of the preceding stage, which yields a phase shift of 110.28° at 170 Hz. The subsequent stages in conjunction with the said preceding stages yield cumulative phase shifts at increasing frequencies.

By the way of example the cumulative phase shifts of the five phase shifting stages of the just described circuit between the input capacitor 112 and the output transistor terminal 154 are 188.42° at 40 Hz, 328.72° at 170 Hz, 495.44° at 725 Hz, 662.32° at 3080 Hz, and 803.72° at 13090 Hz.

In a similar way a second phase shifting circuit is provided, in which the input audio signal is fed through capacitor 113 to a phase splitting circuit comprising the transistor 149 with the collector resistor 147 and the emitter resistor 148, and a phase shifting network with the capacitor 150 and the resistor 151 serially connected between the collector and the emitter of said transistor 149 to produce an output signal at the base of transistor 152, which differs in phase from the input signal by approximately 74° at 40 Hz. The emitter follower with transistor 152 is connected to a second phase splitter stage comprising transistor 153, with an associated phase shifting network similar to that of the preceding stage, which yields a phase shift of 69.86° at 170 Hz. The subsequent stages in conjunction with the stages just referred to yield again a cumulative phase shift at increasing frequencies.

By the way of the same example referred to earlier, the cumulative phase shifts of the five phase shifting stages between the input capacitor 113 and the output terminal 155 are 98.42° at 40 Hz, 238.72° at 170 Hz, 405,44° at 725 Hz, 572.32° at 3080 Hz, and 713.72° at 13090 Hz. As it can be recognized easily by comparing these cumulative phase angles at the given reference frequencies with those of the previously described phase shifter, the phase differences between the above circuits are 90° for all of the indicated frequencies.

Phase measurements on a dual phase shifter of the kind just described showed a deviation of a maximum of 0.7° from the ideal phase difference of 90° over a frequency range from 45 Hz to 16,000 Hz, which, in combination with the beat frequency oscillator signal pair with its ideal phase relationship of 90°, leads to a very high quality performance with a rejection of the unwanted sideband in excess of 45 db. The performance improvement of the five stage cascaded phase shifters is in part made possible by the fact, that the emitter followers preceding the individual phase splitter stages increase the input impedances of said phase splitter circuits, thereby improving the performance of the overall phase shifting circuit. Furthermore the emitter followers compensate the base to emitter voltage drop of the phase splitter transistors by a base to emitter voltage drop of reverse polarity, which allows direct coupling without the otherwise observed cumulative D.C. level changes from the base of transistor 142 to the collector 154 of the last transistor of the upper circuit per FIG. 2, and from the base of transistor 149 to the collector 155 of the last transistor of the lower circuit per FIG. 2.

The output terminals 154 and 155 of said two phase shifting circuits are connected through capacitors 156 and 157 to the four quadrant multipliers 125 and 126 in a similar way as described under FIG. 1 with reference to the phase shifters 12 and 13, leading to the multipliers 25 and 26 respectively. As a further circuit detail FIG. 2 shows the two phase shifters following the low pass 117. One of the phase shifters comprising a resistor and capacitor combination identified by the numeral 118 feeds into the fixed frequency input of mixer 120. The other phase shifter with the resistor and capacitor combination 119 feeds into the fixed frequency input of mixer 121. The components of the phase shifters 118 and 119 are selected to yield outputs with a relative phase relationship of 90°.

In FIG. 3 the apparatus according to the invention is augmented by a second output for supplying a frequency shift, which is the inverse of that obtained at the first output. In detail the phase shifters 212 and 213 of substantially the same circuitry as the corresponding ones described in FIG. 2 are terminated by phase splitter stages with the transistors 248 and 249, respectively. The signal from the emitter of transistor 248 is fed through capacitor 251 to the audio signal input of the multiplier 226. The signal from the emitter of transistor 249 is fed through capacitor 252 to the audio signal input of multiplier 225. The summing network at the outputs of multipliers 225 and 226, comprising the balancing potentiometer 228 and followed by the amplifier 232, combines the two signals, which are processed with the beat frequency so as to produce a frequency shift at the output 238 in the same way as described under FIG. 1.

Multiplier 240 receives an audio signal from the collector of transistor 248 through capacitor 250, which is the inverse of the audio signal fed to multiplier 226. Since the beat frequency fed to the second inputs of multipliers 240 and 226 is the same, the output product of multiplier 240 is the inverse of that of multiplier 226. Thus, when combined with the output product of multiplier 225 in the summing network comprising the potentiometer 242, and followed by the amplifier 246, a frequency shift is obtained, at the output terminal 247, which is the inverse of that at the output terminal 238.

Evidently the same result could be obtained by feeding the audio signal from the emitter of transistor 248 through capacitor 251 to the audio signal input of the multiplier 240 and by feeding a phase inverted signal from the output of the low pass filter 223 to the beat frequency input of multiplier 240. Furthermore it will be evident to those skilled in the art, that the output signal of one or two four quadrant multipliers can be inverted by an inverter stage and summed with the output signal of the other four quadrant multiplier to obtain an inverse frequency shift.

Evidently the circuit shown in FIG. 3 and the modifications thereof described herein, can be enhanced by means to combine the two output signals so as to continuously blend from one sideband to the other.

Furthermore it will be evident, that the input circuits for phase shifting the audio signals as shown in FIG. 2 and described herein can be used in combination with a low frequency signal source, for instance of 5 Hz, with phase shifters for obtaining two signals in 90° phase relationship and feeding into the frequency shifting inputs of two four-quadrant multipliers, followed by a summing network and an output circuit for the production of high quality frequency shifted signals, and for the use in public address systems for the suppression of acoustical feedback.

Other means for enhancing the performance of an apparatus according to the invention or for modifying or simplifying the circuitry within the scope of the invention will be found by those skilled in the art. Therefore, the invention should not be deemed to be limited to the details of what has been described herein by way of example, but it should be rather deemed to be limited only to the scope of the appended claims.

What is claimed is:

1. Electronic apparatus for producing special effects upon audio signals, said apparatus comprising an input circuit feeding into two separate phase shifting networks for the production of output signals with essentially 90° phase difference relative to each other; and a beat frequency oscillator, comprising one fixed frequency ultrasonic oscillator with a sinusoidal output and one variable frequency ultrasonic oscillator, and two phase shifting networks in the signal path of the fixed frequency oscillator for obtaining two signals with 90° phase difference; two multiplicative mixers feeding into low pass filters, said multiplicative mixers receiving one of the 90° phase related fixed frequency signals and one variable frequency signal each for producing two beat frequencies, which are 90° apart in phase; and two four quadrant multipliers, which receive the 90° out-of-phase audio signals at one of their inputs and the 90° out-of-phase beat frequencies at their other inputs, and means to add the output signals of said four quadrant multipliers so as to obtain a resultant signal, which is frequency shifted relative to the input audio signal by the amount of the beat frequency, said means to add the output signals of the four quadrant multipliers being followed by an output circuit.

2. Electronic apparatus for producing special effects upon audio signals, said apparatus comprising an input circuit feeding into two separate phase shifting circuits for the production of output signals with essentially 90° phase difference relative to each other, each of said phase shifting circuits comprising a cascaded arrangement of individual phase shifting stages being directly coupled to each other, and emitter follower stages arranged in direct coupling between said phase shifting stages; and a beat frequency oscillator, comprising one fixed frequency ultrasonic oscillator with a sinusoidal output and one variable frequency ultrasonic oscillator and two phase shifting networks in the signal path of the fixed frequency oscillator for obtaining two signals with 90° phase difference; two multiplicative mixers feeding into low pass filters, said multiplicative mixers receiving one of the 90° phase related fixed frequency signals and one variable frequency signal each for producing two beat frequencies, which are 90° apart in phase; and two four quadrant multipliers, which receive the 90° out-of-phase audio signals at one of their inputs and the 90° out-of-phase beat frequency signals at their other inputs, and means to add the output signals of said four quadrant multipliers so as to obtain a resultant signal, which is frequency shifted relative to the input audio signal by the amount of the beat frequency, said means to add the output of the four quadrant multiplier being followed by an output circuit.

3. Electronic apparatus for producing special or desirable effects upon audio signals, said apparatus comprising an input circuit feeding into two separate phase shifting circuits for the production of output signals with essentially 90° phase difference relative to each other, each of said phase shifting circuits comprising a cascaded arrangement of individual phase shifting stages being directly coupled to each other, and emitter follower stages arranged in direct coupling between said phase shifting stages; and a subsonic oscillator with two outputs in sine/cosine phase relationship; and two four-quadrant multipliers, which receive the 90° out-of-phase audio signals at one of their inputs and the 90° out-of-phase or sine/cosine phase related frequency shifting signals at their other inputs, and means to add the output signals of said four quadrant multipliers so as to obtain a resultant signal, which is frequency shifted relative to the input signal by the frequency of the subsonic oscillator; and said means to add the output signals of said four quadrant multipliers being followed by an output circuit.

4. Electronic apparatus for producing special effects upon audio signals, said apparatus comprising an input circuit feeding into two separate phase shifting networks for the production of output signals with essentially 90° phase difference relative to each other; and a beat frequency oscillator, comprising one fixed frequency ultrasonic oscillator with a sinusoidal output and one variable frequency ultrasonic oscillator, and two phase shifting networks in the signal path of the fixed frequency oscillator for obtaining two signals with 90° phase difference; two multiplicative mixers feeding into low pass filters, said multiplicative mixers receiving one of the 90° phase related fixed frequency signals and one variable frequency signal each for producing two beat frequencies, which are 90° apart in phase; and three four-quadrant multipliers, the first two of which receive the 90° phase related audio signals at one of their inputs and the 90° phase related beat frequency signals at their other input, said first two four-quadrant multipliers being followed by a first summing network and an output circuit; and the third four-quadrant multiplier receiving a phase shifted audio signal at one of its inputs and a phase shifted beat frequency signal at its other input, said audio signal or said beat frequency signal being in opposite phase to the corresponding signal fed to the input of the first four-quadrant multiplier so as to produce a signal at the output of the third four-quadrant multiplier, which is in opposite phase to the one at the output of the first four-quadrant multiplier, and said second and third four-quadrant multiplier being followed by a second summing network and a second output circuit so as to produce a frequency shift, which is of opposite polarity relative to that obtained at the first output circuit.

5. Electronic apparatus for producing special effects upon audio signals, said apparatus comprising an input circuit feeding into two separate phase shifting networks for the production of output signals with essentially 90° phase difference relative to each other; and a beat frequency oscillator, comprising one fixed frequency ultrasonic oscillator with means to make the output signal sinusoidal, and one variable frequency oscillator with means to make the frequency voltage controllable, and two phase shifting networks in the signal path of the fixed frequency oscillator for obtaining two signals with 90° phase difference; two multiplicative mixers feeding into low pass filters, said multiplicative mixers receiving one of the 90° phase related fixed frequencies and one variable frequency signal each for producing two beat frequencies, which are 90° apart in phase; and two output circuits, receiving their signals from two summing networks, said summing networks receiving their signals from at least two four quadrant multipliers, with one of the four quadrant multiplier outputs feeding one of the inputs of both summing networks, and the other input of one of the summing networks receiving a four quadrant multiplier output signal, which is in opposite phase to that received by the other input of the second summing network; and said four quadrant multipliers receiving one signal each from one of the audio input phase shifting circuits and one signal each from one of the beat frequency oscillator outputs.

* * * * *